United States Patent [19]

Chang et al.

[11] Patent Number: 5,003,186

[45] Date of Patent: Mar. 26, 1991

[54] STRATOSPHERIC WELSBACH SEEDING FOR REDUCTION OF GLOBAL WARMING

[75] Inventors: David B. Chang, Tustin; I-Fu Shih, Los Alamitos, both of Calif.

[73] Assignee: Hughes Aircraft Company, Los Angeles, Calif.

[21] Appl. No.: 513,145

[22] Filed: Apr. 23, 1990

[51] Int. Cl.[5] .......... G21K 1/00

[52] U.S. Cl. .......... 250/505.1; 250/504 R; 250/503.1; 244/158 R

[58] Field of Search .......... 250/505.1, 504 R, 503.1, 250/493.1; 244/136, 158 R

[56] References Cited

U.S. PATENT DOCUMENTS 3,222,675 12/1965 Schwartz .......... 244/158

4,755,673 7/1988 Pollack et al. .......... 250/330

*Primary Examiner*—Jack I. Berman

*Attorney, Agent, or Firm*—Michael W. Sales; Wanda Denson-Low

[57] ABSTRACT

A method is described for reducing atmospheric or global warming resulting from the presence of heat-trapping gases in the atmosphere, i.e., from the greenhouse effect. Such gases are relatively transparent to sunshine, but absorb strongly the long-wavelength infrared radiation released by the earth. The method incudes the step of seeding the layer of heat-trapping gases in the atmosphere with particles of materials characterized by wavelength-dependent emissivity. Such materials include Welsbach materials and the oxides of metals which have high emissivity (and thus low reflectivities) in the visible and 8-12 micron infrared wavelength regions.

18 Claims, 2 Drawing Sheets

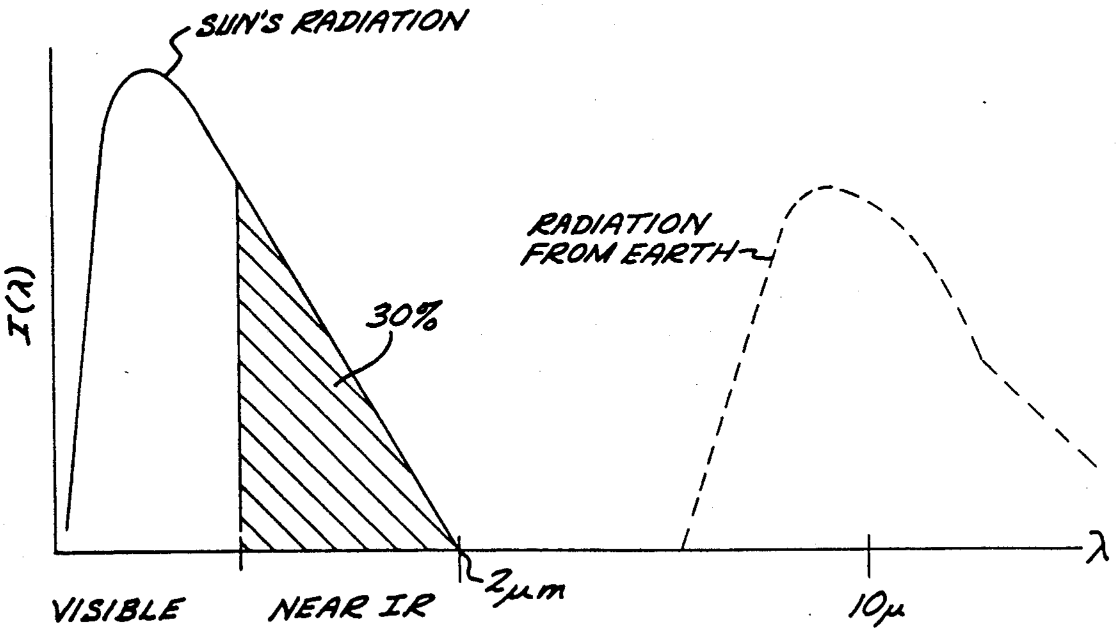
FIG. 2
FIG. 3
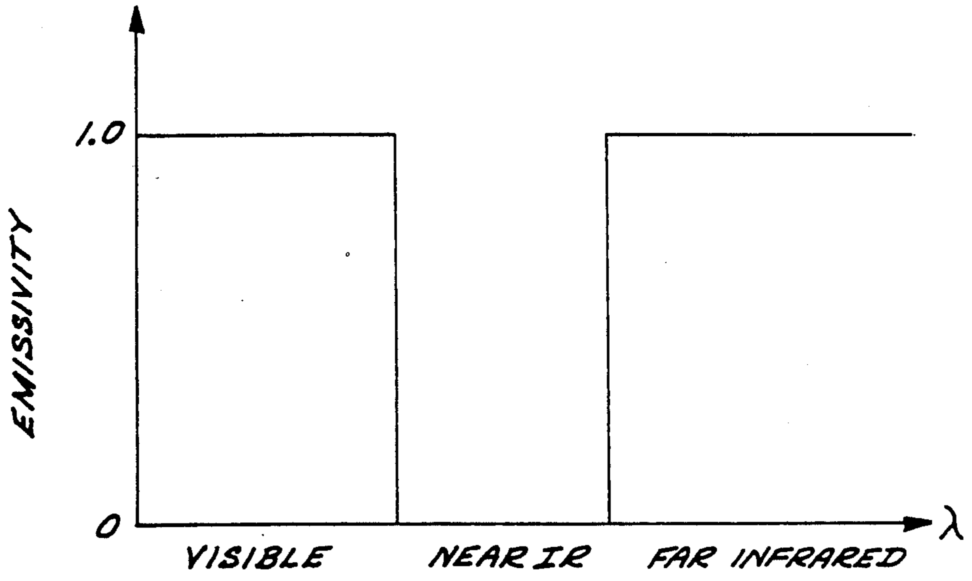

STRATOSPHERIC WELSBACH SEEDING FOR REDUCTION OF GLOBAL WARMING

BACKGROUND OF THE INVENTION

This invention relates to a method for the reduction of global warming resulting from the greenhouse effect, and in particular to a method which involves the seeding of the earth's stratosphere with Welsbach-like materials.

Global warming has been a great concern of many environmental scientists. Scientists believe that the greenhouse effect is responsible for global warming. Greatly increased amounts of heat-trapping gases have been generated since the Industrial Revolution. These gases, such as $CO_2$, CFC, and methane, accumulate in the atmosphere and allow sunlight to stream in freely but block heat from escaping (greenhouse effect). These gases are relatively transparent to sunshine but absorb strongly the long-wavelength infrared radiation released by the earth.

Most current approaches to reduce global warming are to restrict the release of various greenhouse gases, such as $CO_2$, CFC, and methane. These imply the need to establish new regulations and the need to monitor various gases and to enforce the regulations.

One proposed solution to the problem of global warming involves the seeding of the atmosphere with metallic particles. One technique proposed to seed the metallic particles was to add the tiny particles to the fuel of jet airliners, so that the particles would be emitted from the jet engine exhaust while the airliner was at its cruising altitude. While this method would increase the reflection of visible light incident from space, the metallic particles would trap the long wavelength blackbody radiation released from the earth. This could result in net increase in global warming.

It is therefore an object of the present invention to provide a method for reduction of global warming due to the greenhouse effect which permits heat to escape through the atmosphere.

SUMMARY OF THE INVENTION

A method is disclosed for reducing atmospheric warming due to the greenhouse effect resulting from a greenhouse gases layer. The method comprises the step of seeding the greenhouse gas layer with a quantity of tiny particles of materials characterized by wavelength-dependent emissivity or reflectivity, in that said materials have high emissivities in the visible and far infrared wavelength regions and low emissivity in the near infrared wavelength region. Such materials can include the class of materials known as Welsbach materials. The oxides of metal, e.g., aluminum oxide, are also suitable for the purpose. The greenhouse gases layer typically extends between about seven and thirteen kilometers above the earth's surface. The seeding of the stratosphere occurs within this layer. The particles suspended in the stratosphere as a result of the seeding provide a mechanism for converting the blackbody radiation emitted by the earth at near infrared wavelengths into radiation in the visible and far infrared wavelength so that this heat energy may be reradiated out into space, thereby reducing the global warming due to the greenhouse effect.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 2 is a graph illustrating the intensity of sunlight incident on earth and of the earth's blackbody radiation as a function of wavelength.

FIG. 3 is a graph illustrating an ideal emissivity versus wavelength function for the desired particle material.

DETAILED DESCRIPTION OF THE PREFERRED EMBODIMENT

Figure 1:
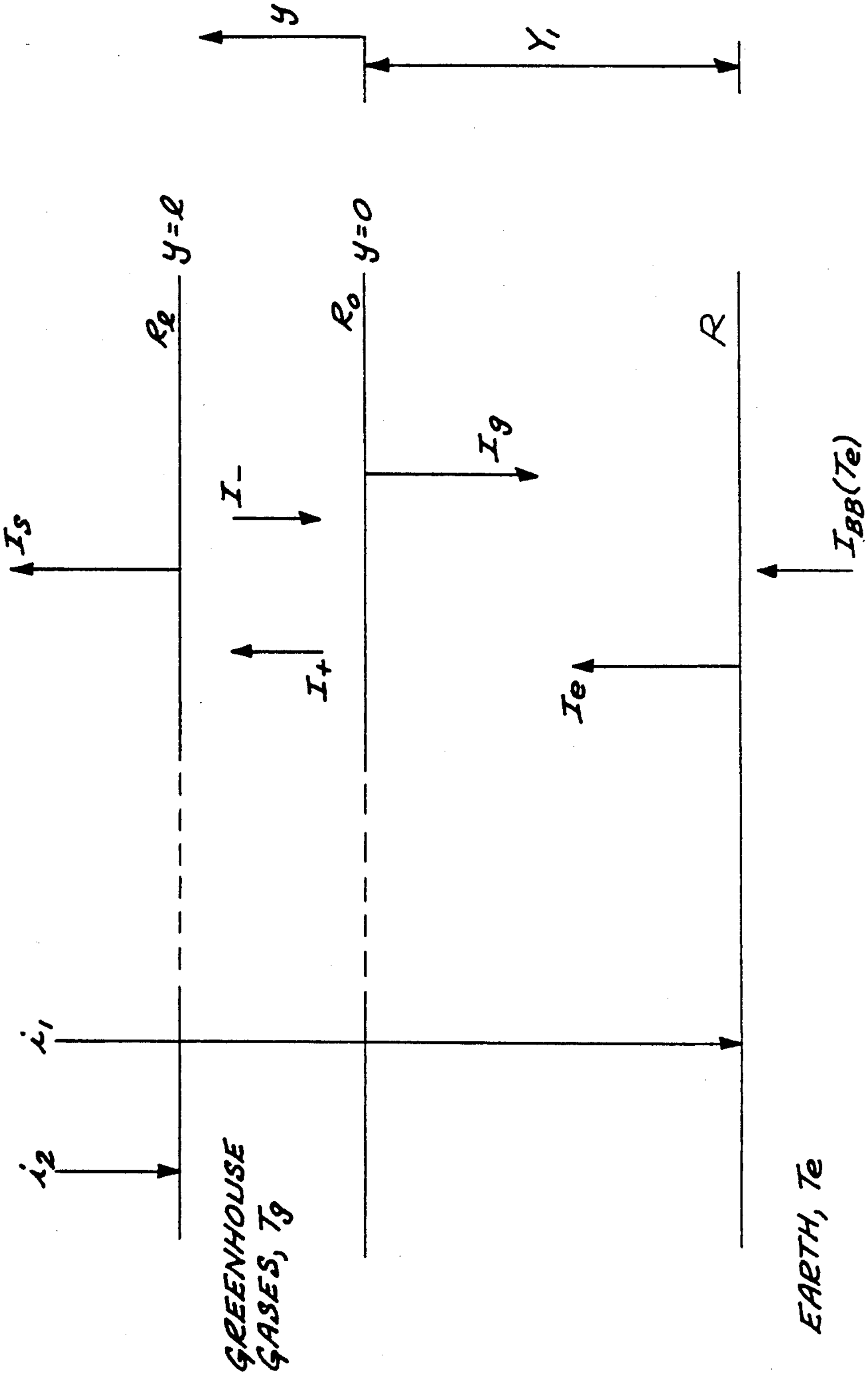
FIG. 1 illustrates a model for the heat trapping phenomenon, i.e., the greenhouse effect.

FIG. 1 shows a model for the heat-trapping (greenhouse effect) phenomenon. It is assumed that the greenhouse gases are concentrated at altitudes between $y=0$ (at some altitude $Y_1$, above the earth's surface) and $y=1$. Regardless of the sunshine reflected back into space, $i_1$ and $i_2$ denote the shortwavelength sunlight energies that are absorbed by the earth's surface and the greenhouse gases, respectively. Available data shows that $i_1=0.45\ i_{sol}$ and $i_2=0.25\ i_{sol}$, where $i_{sol}$ is the total flux from the sun. The short wavelength sunlight heats up the greenhouse gases and the earth surface, and this energy is eventually reradiated out in the long wavelength infrared region.

FIG. 2 is a graph illustrating the intensity of sunlight and the earth's blackbody radiation as a function of wavelength. As illustrated, some 30% of the sunlight energy is in the near infrared region. The earth's blackbody radiation, on the other hand, is at the far infrared wavelength.

Referring again to FIG. 1, $I_s$, $I_+$, $I_-$, $I_g$ and $I_e$ represent the fluxes in the infrared wavelength region, where $I_s$ and $I_g$ are the fluxes reradiated by the greenhouse gases toward the sky and ground, respectively; $I_e$ is the flux reradiated by the earth; and $I_+$ and $I_-$ are fluxes within the gases radiating toward the space and ground, respectively. $I_+$ and $I_-$ are functions of y, e.g., $I_+(0)$ is the $I_+$ flux at $y=0$. Considering the principles of energy conservation and continuity at boundaries, the following relationships are obtained:

$$I_s=i_1+i_2 \tag{1}$$

$$I_s=I_+(1)(1-R_l) \tag{2}$$

$$I_-(1)=I_+(1)R_l \tag{3}$$

$$I_+(0)=I_-(0)R_o+I_e(1-R_o) \tag{4}$$

$$I_g=I_-(0)(1-R_o)+I_eR_o \tag{5}$$

$$I_e=I_{BB}(T_e)(1-R)+I_gR \tag{6}$$

$$I_e=i_1+I_g \tag{7}$$

where $R_o$, $R_l$ and R are the reflectivities at the y=0 and y=1 boundaries and at the earth's surface. $I_{BB}(T_e)$ is the blackbody radiation flux at the earth's temperature $T_e$. Within the greenhouse gases' layer, the energy equations are $$(dI_+/dy)=I_{BB}(T_g)-\alpha I_+ \quad (8)$$

$$-(dI_-/dy)=I_{BB}(T_g)-\alpha I_- \quad (9)$$

where $I_{BB}(T_g)$ is the blackbody radiation flux at the greenhouse gases' temperature $T_g$, and $\alpha$ is the absorption coefficient of the gases. The solutions of equations 8 and 9 are given by equations 10 and 11:

$$I_+(y)=(I_{BB}/\alpha)+Ce^{\alpha y} \quad (10)$$

$$I_-(y)=(I_{BB}/\alpha)+De^{+\alpha y} \quad (11)$$

To illustrate the effects of $R_o$ and $R_l$ on the greenhouse effect, the extreme case is considered wherein a high concentration of greenhouse gases has strong absorption in the infrared region; that is, for y=1, $e^{-\alpha l}$ approaches 0. Then, using Equations 3 and 4, the relationships of Equations 12 and 13 are obtained.

$$C=(I_e-(I_{BB}/\alpha))(1-R_o) \quad (12)$$

$$D=0$$

From Equations 5 and 7, $$I_e=i_1+I_-(0)(1-R_o)+I_eR_o,$$

or $$I_e=(i_1/(1-R_o))+(I_{BB}/\alpha). \quad (14)$$

From Equations 2 and 1, $$I_s=(I_{BB}/\alpha)(1-R_l)=i_1+i_2,$$

or $$(I_{BB}/\alpha)=(i_1+i_2)/(1-R_l). \quad (15)$$

Combining Equations 14 and 15, the relationship of Equation 16 is obtained.

$$I_e=i_1/(1-R_o)+(i_1+i_2)/(1-R_l) \quad (16)$$

Finally, Equation 6 gives the blackbody radiation from the earth's surface in terms of $i_1$ and $i_2$ and the three reflectivities:

$$I_e=I_{BB}(T_e)(1-R)+(I_e-i_1)R$$

$$I_{BB}(T_e)=I_e+(R/(1-R))i_1$$

or $$I_{BB}(T_e)=i_1/(1-R_o)+(i_1+i_2)/(1-R_l)+(R/(1-R))i_1 \quad (17)$$

To achieve a lower temperature of the earth, (considering $i_1$, $i_2$ and R as constants), it is desirable to make R and $R_l$ as small as possible.

Known refractory materials have a thermal emissivity function which is strongly wavelength dependent. For example, the materials may have high emissivity (and absorption) at the far infrared wavelengths, high emissivity in the visible wavelength range, and very low emissivity at intermediate wavelengths. If a material having those emissivity characteristics and a black body are exposed to IR energy of equal intensity, the selective thermal radiator will emit visible radiation with higher efficiency (if radiation cooling predominates), i.e., the selective thermal radiator will appear brighter than the black body. This effect is known as the Welsbach effect and is extensively used in commercial gas lantern mantles.

Welsbach materials have the characteristic of wavelength-dependent emissivity (or reflectivity). For example, thorium oxide ($ThO_2$) has high emissivities in the visible and far IR regions but it has low emissivity in the near IR region. So, in accordance with the invention, the layer of greenhouse gases is seeded with Welsbach or Welsbach-like materials which have high emissivities (and thus low reflectivities) in the visible and 8–12 micrometer infrared regions, which has the effect of reducing $R_o$ and $R_l$ while introducing no effect in the visible range.

A desired material for the stratospheric seeding has a reflection coefficient close to unity for near IR radiation, and a reflection coefficient close to zero (or emissity close to unity) for far IR radiation. FIG. 3 is a graph illustrating an ideal emissivity versus wavelength function for the desired material. Another class of materials having the desired property includes the oxides of metals. For example, aluminum oxide ($Al_2O_3$) is one metal oxide suitable for the purpose and which is relatively inexpensive.

It is presently believed that particle sizes in the ten to one hundred micron range would be suitable for the seeding purposes. Larger particles would tend to settle to the earth more quickly.

The particles in the required size range can be obtained with conventional methods of grinding and meshing.

It is believed that the number of particles $n_d$ per unit area in the particle layer should be defined by Equation 18:

$$n_d l \geqq 1/\sigma_{abs} \quad (18)$$

where l is the thickness of the particle layer and $\sigma_{abs}$ is the absorption coefficient of the particles at the long IR wavelengths. One crude estimate of the density of particles is given by Equation (19):

$$n_d l \geqq (cmw)/(4\pi e^2) \quad (19)$$

where c is the speed of light, m is the average particle mass, e is the electron charge, and w is the absorption line width in $sec^{-1}$.

The greenhouse gases are typically in the earth's stratosphere at an altitude of seven to thirteen kilometers. This suggests that the particle seeding should be done at an altitude on the order of 10 kilometers. The particles may be seeded by dispersal from seeding aircraft; one exemplary technique may be via the jet fuel as suggested by prior work regarding the metallic particles. Once the tiny particles have been dispersed into the atmosphere, the particles may remain in suspension for up to one year.

It is understood that the above-described embodiment is merely illustrative of the possible specific embodiments which may represent principles of the present invention. Other arrangements may readily be devised in accordance with these principles by those skilled in the art without departing from the scope and spirit of the invention.

What is claimed is:

1. A method of reducing atmospheric warming due to the greenhouse effect resulting from a layer of gases in the atmosphere which absorb strongly near infrared wavelength radiation, comprising the step of dispersing tiny particles of a material within the gases' layer, the particle material characterized by wavelength-dependent emissivity or reflectivity, in that said material has high emissivities with respect to radiation in the visible and far infrared wavelength spectra, and low emissivity in the near infrared wavelength spectrum, whereby said tiny particles provide a means for converting infrared heat energy into far infrared radiation which is radiated into space.

2. The method of claim wherein said material comprises one or more of the oxides of metals.

3. The method of claim 1 wherein said material comprises aluminum oxide.

4. The method of claim 1 wherein said material comprises thorium oxide.

5. The method of claim 1 wherein said particles are dispersed by seeding the stratosphere with a quantity of said particles at altitudes in the range of seven to thirteen kilometers above the earth's surface.

6. The method of claim 1 wherein the size of said particles is in the range of ten to one hundred microns.

7. The method of claim wherein said material comprises a refractory material.

8. The method of claim 1 wherein said material is a Welsbach material.

9. The method of claim 1 wherein the number of said dispersed particles per unit area in the particle layer is greater than or equal to $1/\sigma_{abs}l$, where l is the thickness of the particle layer and $\sigma_{abs}$ is the absorption coefficient of the particles at the far infrared wavelengths.

10. A method for reducing atmospheric warming due to the greenhouse effect resulting from a greenhouse gases layer, comprising the following step:

seeding the greenhouse gases' layer with a quantity of tiny particles of a material characterized by wavelength-dependent emissivity or reflectivity, in that said materials have high emissivities in the visible and far infrared wavelength spectra and low emissivity in the near infrared wavelength spectrum, whereby said particles are suspended within said gases' layer and provide a means for converting radiative energy at near infrared wavelengths into radiation at the far infrared wavelengths, permitting some of the converted radiation to escape into space.

11. The method of claim 10 wherein said material comprises one or more of the oxides of metals.

12. The method of claim 10 wherein said material comprises aluminum oxide.

13. The method of claim 10 wherein said material is thorium oxide.

14. The method of claim 10 wherein said seeding is performed at altitudes in the range of seven to thirteen kilometers above the earth's surface.

15. The method of claim 10 wherein said material comprises a refractory material.

16. The method of claim 10 wherein said particle size is in range of ten to one hundred microns.

17. The method of claim 10 wherein said material is a Welsbach material.

18. The method of claim 10 wherein the number of said dispersed particles per unit area in the particle layer is greater than or equal to $1/\sigma_{abs}l$, where l is the thickness of the particle layer and $\sigma_{abs}$ is the absorption coefficient of the particles at the far infrared wavelengths.

* * * * *